United States Patent [19]
Anderson

[11] Patent Number: 5,533,476
[45] Date of Patent: Jul. 9, 1996

[54] WALLED PRECOMBUSTION CHAMBER UNIT

[75] Inventor: Alan C. Anderson, Painted Post, N.Y.

[73] Assignee: Dresser-Rand Company, Corning, N.Y.

[21] Appl. No.: 490,367

[22] Filed: Jun. 14, 1995

[51] Int. Cl.⁶ .................................................. F02B 19/12
[52] U.S. Cl. .......................................... 123/267; 123/273
[58] Field of Search .................................. 123/266, 267, 123/273

[56] References Cited

U.S. PATENT DOCUMENTS

| 3,154,058 | 10/1964 | Warren | 123/267 |
| 3,406,667 | 10/1968 | Evans et al. | 123/267 |
| 3,453,993 | 7/1969 | Saletzki et al. | 123/273 |
| 4,256,071 | 3/1981 | Casull | 123/273 X |
| 4,306,526 | 12/1981 | Schaub et al. | 123/257 |
| 5,230,313 | 7/1993 | Bisel et al. | 123/266 |
| 5,241,930 | 9/1993 | Dupler | 123/267 X |
| 5,431,140 | 7/1995 | Faulkner | 123/267 X |

FOREIGN PATENT DOCUMENTS 2153219  5/1973  Germany ........................... 123/267

Primary Examiner—Tony M. Argenbright
Attorney, Agent, or Firm—Bernard J. Murphy

[57] ABSTRACT

A body, having a substantially closed cell formed therewithin, has a projecting nozzle, externally threaded, for threaded engagement with the sparkplug hole in a gas engine cylinder head. The body has two passageways formed therein, each threaded, for admitting fuel into the cell and for mounting a sparkplug or such ignition device thereinto. The body nestably sets into the sparkplug cavity, in the cylinder head, and mounts fluid seals thereabout. Ports broached in walls of the cylinder head water jacketing admit cooling water to the body to dissipate the heat of the precombustion product.

7 Claims, 2 Drawing Sheets

WALLED PRECOMBUSTION CHAMBER UNIT

This invention pertains to precombustion chamber units, such as are employed in natural gas fueled engines, and in particular to a walled, precombustion chamber unit which is readily receivable in the normal sparkplug, threaded hole in the engine cylinder head.

In the prior art there have been disclosures of adapters receivable in sparkplug holes and accommodating a fuel admitting channel therein as well as the standard sparkplug. Exemplary thereof is the Spark Plug Adapter, set out in U.S. Pat. No. 5,241,930, issued on Sep. 7, 1993, to W. Theodore Dupler. It is commendable, but it does not have a substantially closed cell formed therewithin. Another novel approach is disclosed in U.S. Pat. No. 5,230,313, issued on 27 Jul. 1993, to Gary Bisel and Charles F. Wilke for a Gas Engine Cylinder Cylinder Head, and a Method of Retrofitting the Head with a Precombustion Chamber Unit. This too advances the art, and offers water-cooling of the precombustion chamber. However, it requires that a sparkplug hole be reamed out to accommodate the precombustion chamber unit therein, and means for holding the latter in place.

It is an object of this invention to set forth a walled precombustion chamber unit which is facilely threaded directly into a sparkplug hole in an engine cylinder head, which has a substantially closed cell formed therein, and which mounts sealing elements thereabout in order to facilitate water-cooling thereof by the cylinder head cooling jacketing.

Particularly, it is an object of this invention to set forth a walled, precombustion chamber unit comprising a body; said body having (a) a substantially closed cell formed therewithin, (b) a nozzle depending therefrom, (c) means for admitting fuel into said cell, and (d) means for mounting an ignition device thereinto; and wherein said nozzle is externally threaded.

Further objects of this invention, as well as the novel features thereof will become apparent by reference to the following description, taken in conjunction with the accompanying figures, in which.

Figure 1:
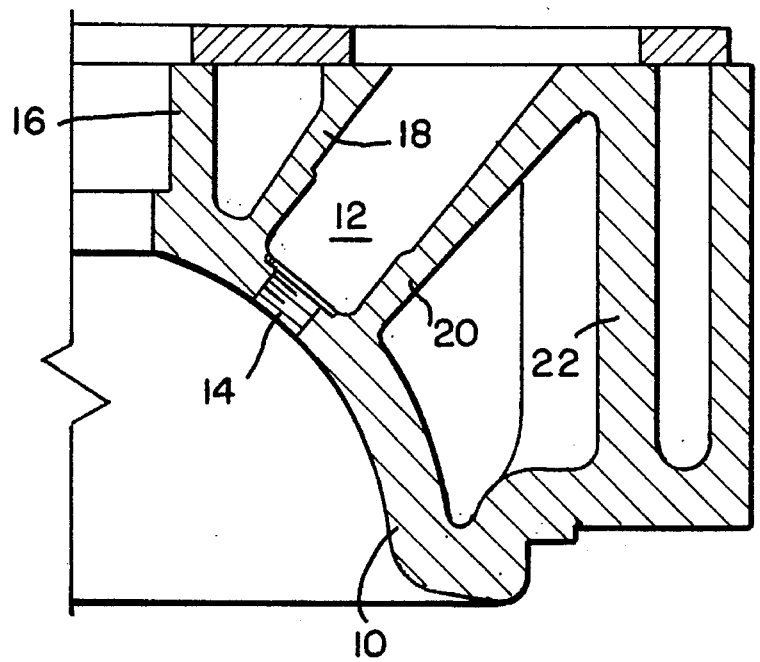
FIG. 1 is a fragmentary and cross-sectional view of a cylinder head, the same showing the sparkplug cavity and threaded hole for receiving a sparkplug.

As shown in FIG. 1, a fragmentary portion of a cylinder head 10 has a sparkplug cavity 12 formed therein, the latter having an internally threaded hole 14 into which a sparkplug is threadedly receivable. Cast walls 16, 18, 20, and 22 comprise water jacketing for guiding cooling water through the head 10. Walls 18 and 20 are not broached, as it is necessary to keep the cavity 12 shielded from water.

Figure 2:
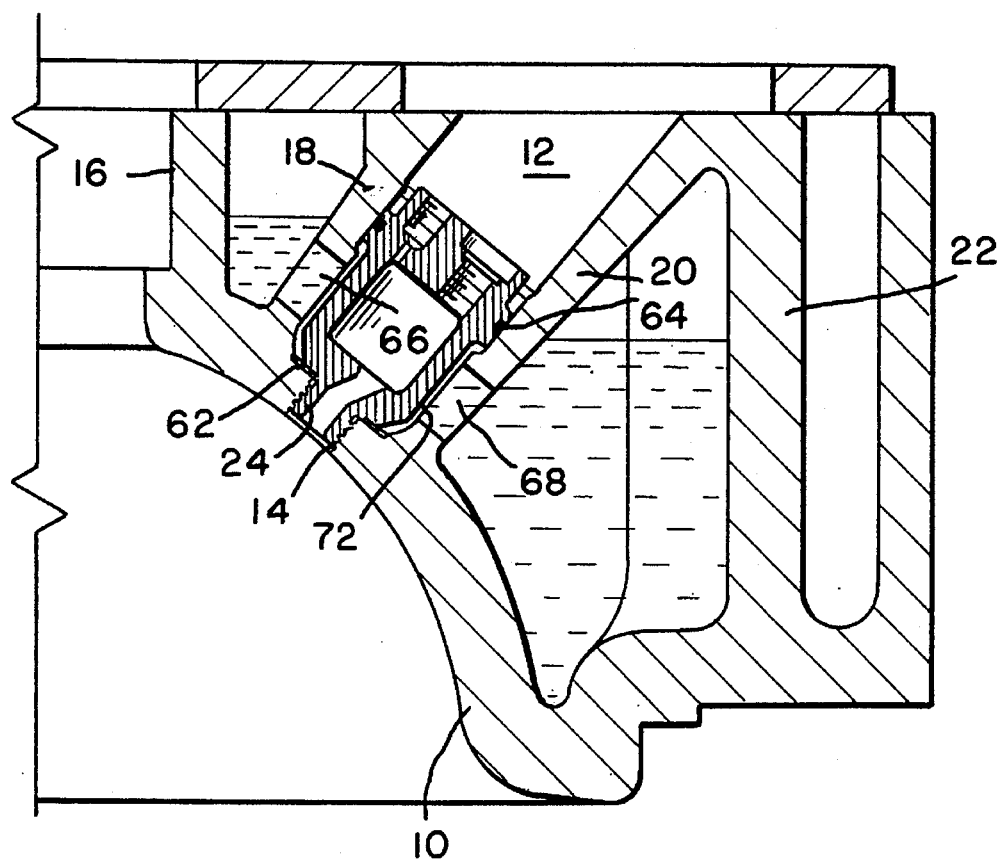
FIG. 2 is a view like that of FIG. 1 in which, however, a walled, precombustion chamber unit, according to an embodiment of the invention, is threadedly secured in the sparkplug threaded hole.
Figure 4:
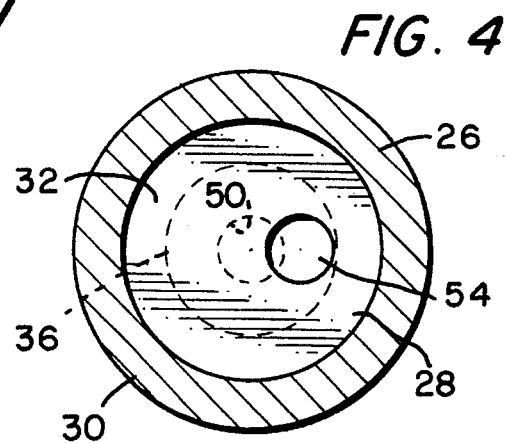
FIG. 4 is a cross-sectional view taken along section 4—4 of FIG. 3.
Figure 3:
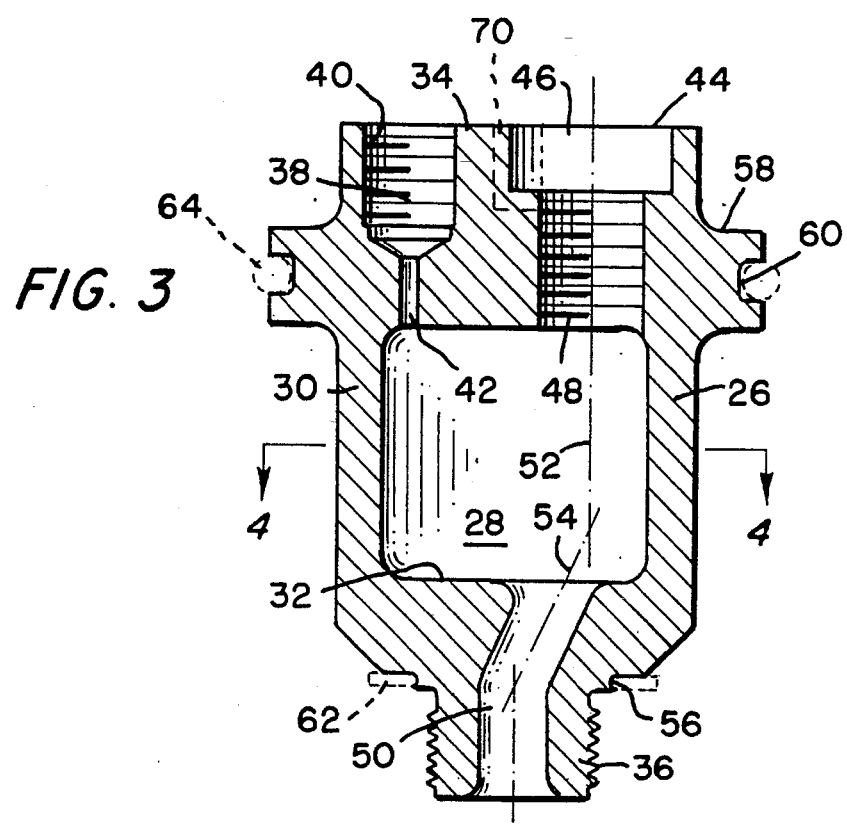
FIG. 3 is an enlarged, cross-sectional view of the unit of FIG. 2 taken along the vertical axis thereof.

FIG. 2 shows the same head 10 and cavity 12, now with the novel precombustion chamber unit 24 set in the hole 14. Unit 24, shown in greater enlargment, and in cross-sections, in FIGS. 3 and 4, comprises a body 26 having a substantially closed cell 28 formed therewithin. The body 26 has a circumferential wall 30, a bottom 32 and a top 34 which enclose the cell 28. A nozzle 36 extends, perpendicularly, from the bottom 32, and is externally threaded for threaded engagement with the hole 14. A first passageway 38, having a plurality of diverse diameters, is formed through the top 34, and the largest diameter 40 thereof is internally threaded; the smallest diameter 42 thereof is relatively narrow. Passageway 38 comprises means for admitting fuel into the cell 28. A second passageway 44 is also formed through the top 34, this passageway having a pair of diverse diameters 46 and 48. The smaller of these, diameter 48, is internally threaded to receive a sparkplug therein. The nozzle 36 has a bore 50 formed therethrough, the bore extending through a portion of the bottom 32 and opening into the cell 28. Passageway 44 has a center axis 52, and bore 50 has a center axis 54, the two axes 52 and 54 bisect within the cell 28.

In order to permit cooling of the unit 24 by the cylinder head 10 cooling water, the unit 24 is configured with means for receiving fluid seals thereabout. At the underlying surface of the bottom 32, and circumjacent the nozzle 36, is provided a seal-receiving groove 56. Further, the body 26 has an annular, outwardly-extending flange 58 with a seal-receiving groove 60 formed in the periphery thereof.

Reverting, again to FIG. 2, the unit 24 is shown in the cavity 12, and seals 62 and 64 are shown nested in the grooves 56 and 60, respectively. In addition, now, the walls 18 and 20 have been broached; ports 66 and 68 have been formed therethrough to permit the cooling water in the head 10 to cool the unit 24. The seals 62 and 64 prevent the water from entering the combustion chamber (downstream of the nozzle 36) and from venting out of the head 10. Similarly, seal 62 prevents combustion gases from entering the cavity 12, and seal 64 also keeps detritus out of the cavity 12.

Figure 5:
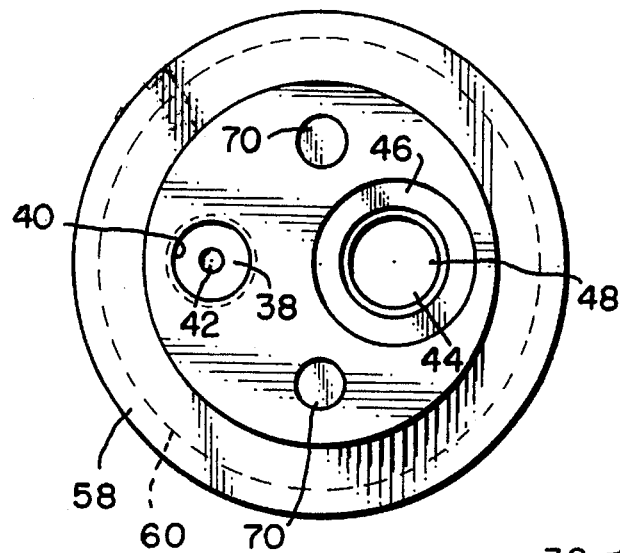
FIG. 5 is a plan view of the top of the unit of FIGS. 2 through 4.

The unit 24 is threaded into the threaded hole 14 by means of a doweled-type spanner wrench (not shown) which engages the two tool-receiving holes 70 shown, in FIG. 5, in the top 34 of the unit 24. The wrench makes the unit 24 fast in the hole 14, and compresses the seal 62 firmly in place. Seal 64 makes a tight fit in the cavity 12. The unit 24 is so dimensioned, in relation to the cavity 12, that there obtains a narrow clearance 72 between the outer surface of the unit 24 and the side wall of the cavity 12. Consequently, the cooling water, admitted via the ports 66 and 68, is free to surround the unit 24 and dissipate heat generated in the cell by the precombustion products produced therein by fuel admitted through passageway 38 and the ignition thereof effected by a sparkplug in passageway 44.

While I have described my invention in connection with a specific embodiment thereof, it is to be clearly understood that this is done only by way of example, and not as a limitation to the scope of the invention, as set forth in the objects thereof and in the appended claims.

I claim:

1. A walled, precombustion chamber unit, comprising:

a body;

said body having (a) a substantially closed cell formed therewithin, (b) a nozzle depending therefrom, (c) means for admitting fuel into said cell, and (d) means for mounting an ignition device thereinto; and wherein said nozzle is externally threaded;

said body comprises a circumferential wall, a bottom, and a top;

said wall, bottom and top enclose said cell;

said fuel admitting means comprises a first passageway formed through said top;

said mounting means comprises a second passageway formed through said top; and said passageways are internally threaded.

2. A walled, precombustion chamber unit, comprising:

a body;

said body having (a) a substantially closed cell formed therewithin, (b) a nozzle depending therefrom, (c) means for admitting fuel into said cell, and (d) means for mounting an ignition device thereinto; and wherein said nozzle is externally threaded;

said body further has an annular, outwardly extending flange; and said flange has an annular, seal-receiving groove formed in the periphery thereof.

3. A walled, precombustion chamber unit, comprising:

a body;

said body having (a) a substantially closed cell formed therewithin, (b) a nozzle depending therefrom, (c) means for admitting fuel into said cell, and (d) means for mounting an ignition device thereinto; and wherein said nozzle is externally threaded;

said body comprises a circumferential wall, a bottom, and a top;

said wall, bottom and top enclose said cell;

said fuel admitting means comprises a first passageway formed through said top; and said top has means for receiving a wrenching tool thereon.

4. A walled, precombustion chamber unit, according to claim 3, wherein:

said tool receiving means comprises a plurality of holes formed in said top.

5. A walled, precombustion chamber unit, comprising:

a body;

said body having (a) a substantially closed cell formed therewithin, (b) a nozzle depending therefrom, (c) means for admitting fuel into said cell, and (d) means for mounting an ignition device thereinto; and wherein said nozzle is externally threaded;

said body comprises a circumferential wall, a bottom, and a top;

said wall, bottom and top enclose said cell;

said fuel admitting means comprises a first passageway formed through said top;

said first passageway has a plurality of diverse diameters; and the smaller of said diameters is threaded.

6. A walled, precombustion chamber unit, comprising:

a body;

said body having (a) a substantially closed cell formed therewithin, (b) a nozzle depending therefrom, (c) means for admitting fuel into said cell, and (d) means for mounting an ignition device thereinto; and wherein said nozzle is externally threaded;

said nozzle has a bore formed therein which opens into said cell through an underlying surface of said cell, and externally of said body;

said fuel admitting means comprises a passageway opening externally of said body, and internally into said cell;

said bore opens into said cell, as aforesaid, at a first side of said cell; and said passageway opens into said cell, as aforesaid, at a second side of said cell which is opposite said first side thereof.

7. A walled, precombustion chamber unit, comprising:

a body;

said body having (a) a substantially closed cell formed therewithin, (b) a nozzle depending therefrom, (c) means for admitting fuel into said cell, and (d) means for mounting an ignition device thereinto; and wherein said nozzle is externally threaded;

said nozzle has a bore formed therein which opens into said cell through an underlying surface of said cell, and externally of said body;

said bore has a center axis;

said mounting means comprises a passageway opening externally of said body, and internally into said cell;

said passageway has a center axis; and said axes bisect within said cell.

* * * * *